US006421177B1

(12) United States Patent
Leyva et al.

(10) Patent No.: US 6,421,177 B1
(45) Date of Patent: Jul. 16, 2002

(54) INTERLEAVING OPTICAL FILTER

(75) Inventors: Victor Leyva, Pasadena; Xian-Li Yeh, Walnut; George Rakuljic, Santa Monica, all of CA (US)

(73) Assignee: Arroyo Optics, Inc., Santa Monica, CA (US)

( * ) Notice: Subject to any disclaimer, the term of this patent is extended or adjusted under 35 U.S.C. 154(b) by 0 days.

(21) Appl. No.: 09/518,218

(22) Filed: Mar. 3, 2000

(51) Int. Cl.[7] .............................. G02B 5/30; G02F 1/01; H04J 14/02

(52) U.S. Cl. ................. 359/495; 359/497; 359/498; 359/499; 359/288; 359/122; 359/124; 359/129; 359/131; 359/500; 359/487; 385/31; 385/33

(58) Field of Search ................................ 359/250, 256, 359/278, 279, 298, 288, 487, 495, 497, 498, 499, 500, 122, 124, 129, 131; 385/31, 33

(56) References Cited

U.S. PATENT DOCUMENTS

| | | | |
|---|---|---|---|
| 3,304,428 A | | 2/1967 | Peters |
| 3,529,885 A | * | 9/1970 | Ammann |
| 3,536,921 A | | 10/1970 | Caulfield |
| 4,129,357 A | * | 12/1978 | Title |
| 4,327,971 A | | 5/1982 | Kondo |
| 4,500,178 A | * | 2/1985 | Yeh |
| 4,566,761 A | | 1/1986 | Carlsen et al. ............... 350/401 |
| 4,650,289 A | * | 3/1987 | Kuwahara |
| 4,678,287 A | * | 7/1987 | Buhrer ........................ 359/498 |
| 4,685,773 A | | 8/1987 | Carlsen et al. ............... 350/401 |

(List continued on next page.)

FOREIGN PATENT DOCUMENTS

WO     WO 00/11510     3/2000

OTHER PUBLICATIONS

Harris, S.E.; Ammann, E.O.; Chang I.C.; Optical Network Synthesis Using Birefringent Crystals.* I. Synthesis of Lossless Networks of Equal–Length Crystals; *Journal of the Optical Society of America*, vol. 54, No. 10, Oct. 1964; pp. 1267–1279.

Kimura, T.; Saruwatari, M.; Temperature Compensation of Birefringent Optical Fibers; Proceedings of the IEEE, Aug. 1971; pp. 1273–1274.

Kinsel, Tracy S.; Wide–Band Optical Communication Systems: Part I—Time Division Multiplexing; *Bell Telephone Laboratories*; Aug. 1970; pp. 2–18.

Carlsen, W.J.; Buhrer, C.F.; Optical Multiplexers; *Electronics Letters*; Jan. 29, 1987; vol. 23, No. 3, pp. 106–107.

Françon, M.; Polarization Interferometer from Optical Interferometry; *Academic Press*, 1966, pps156 Fig. 7.30 "Jamin Polarization Interferometer".

Hariharan, P.; Optical Interferometry; *Academic Press*, 1985; pp. 121 & 146.

Krol, M.F.; PCT Publication No. WO 00/11510, publ. Mar. 2, 2000.

Katys, G. P., Kravtsov, N.V.; Chirkov, L. Ye.; Konovalov, S.M.; Modulation and Deflection of Optical Radiation; *Modulyatsiya I otklonenoiye opticheskogo izlucheniya*; Moscow, Nauka, 1967, vol. 176, pp. 42–47.

*Primary Examiner*—Ricky D. Shafer
(74) *Attorney, Agent, or Firm*—Jones, Tullar & Cooper, P.C.

(57) ABSTRACT

An optical signal filter for providing a periodic transfer function in transmitting signals within a selected bandwidth, by which passbands are interleavered into groups of separate outputs. The filter employs the transmissivity characteristic of birefringent crystals in conjunction with splitting the input beam into orthogonal and separate components, while compensating for temperature variations by pairing crystals of different types. The transmissivity functions are independent of the polarization of the input beam, and are shaped to flatten transmissivity peaks by the use of cascaded stages of birefringent crystal pairs.

10 Claims, 6 Drawing Sheets

U.S. PATENT DOCUMENTS

| | | | |
|---|---|---|---|
| 4,744,075 A | * | 5/1988 | Buhrer |
| 4,976,517 A | | 12/1990 | Kozuka |
| 4,987,567 A | * | 1/1991 | Buhrer |
| 5,111,321 A | * | 5/1992 | Patel |
| 5,212,586 A | * | 5/1993 | Van Delden |
| 5,305,136 A | | 4/1994 | Smith |
| 5,606,439 A | * | 2/1997 | Wu .............................. 385/31 |
| 5,734,762 A | | 3/1998 | Ho |
| 5,867,291 A | | 2/1999 | Wu et al. |
| 5,912,748 A | | 6/1999 | Wu et al. |
| 6,028,702 A | | 2/2000 | Sasaki |
| 6,130,971 A | | 10/2000 | Cao |
| 6,252,711 B1 | * | 6/2001 | Damask et al. ............. 359/498 |

* cited by examiner

INTERLEAVING OPTICAL FILTER

FIELD OF THE INVENTION

This invention relates to wavelength division mutiplexed (DWDM) systems used in optical fiber communications, and more particularly to optical signal filters which separate a WDM channel stream into groups of channels on separate fibers.

BACKGROUND OF THE INVENTION

Narrow band optical filters are essential in wavelength division (WDM) communication systems in order to process signals at different precisely spaced wavelengths. Low insertion loss, flat top filter response, sharp cutoff, and the ability to scale to high channel counts and dense channel spacing are all critical parameters. An interleaving filter is a device or subsystem which can separate multiple channels in a WDM transmission into groups. A 1×2 interleaving filter divides a WDM channel stream, periodically spaced in optical frequency, in a manner such that every other channel is, launched into one of two separate fibers. More generally a 1×N interleaving filter, separates every Nth channel into one of N fibers.

The interleaving function, more broadly speaking, includes establishing a periodic transmissivity characteristic within a given wider frequency band, so that there is virtually lossless transmission within incrementally spaced frequency channels, and in effect full signal rejection between the channels. Preferably, the transmissive pass bands are shaped with flat top response, so that laser wavelength shifts and other variations within the pass bands can be tolerated, thus reducing the stringency of performance specifications imposed on such active elements. Therefore, in multiplexing, channel spacings can be reduced with improved performance, while in demultiplexing closely spaced channels can be separated without requiring prohibitively precise individual components, such as add/drop filters. In demultiplexing, interleaving filters can also serve to reduce the component counts and serial insertion losses, because they separate signals in parallel fashion and can be cascaded to divide channels into a number of smaller groups before wavelength selective devices are used to add or drop individual wavelength signals.

The most common approach to interleaving filter design is based upon using unbalanced Mach-Zender interferometers. These are adequately responsive but are large, costly units that are difficult to adapt to many system requirements. In addition, they are subject to inherent instability problems that require extra measures to overcome. Thin film 200 GHz filters are now being offered, but thin films require costly and precise processes. Other periodic optical transmission functions are known, such as those exhibited by birefringent crystals, as delineated in detail by Yeh and Yariv in "Optical Waves in Crystals", John Wiley and Sons (1983). As the authors explain, a birefringent element sandwiched between parallel polarizers has a transmission characteristic that is periodic in optical frequency, and effectively without loss at transmissive peaks. Much analytical work, of both theoretical and practical natures has been directed to using the properties of birefringent crystals. In 1964, for example, Harris et al proposed a procedure for the synthesis of optical networks in an article in the Journal of the Optical Society of America, Vol. 54, No. 10 (October 1964), pp. 1267–1279, entitled "Optical Network Synthesis Using Birefringent Crystals". This article treats some of the considerations fundamental to synthesizing specific transfer functions using a series of birefringent crystals between entry and exit polarizers. Subsequently, Kimura et al discussed a technique for reducing thermally induced variations in an article entitled "Temperature Compensation of Birefringent Optical Filters", in the Proceedings of the IEEE, August 1971, pp. 1271–2. They disclosed that if the signs of the birefringence of two different crystals are opposite, the retardation of the series is less dependent on temperature. Although the intended purpose of the device described is as a filter for frequency stabilization, one of the articles cited, "Wide-band Optical Communication Systems, Part I—Time Division Multiplexing", by T. S. Kinsel, Proc. IEEE, Vol. 58, October 1970, pp. 1666–1683 is referenced in regard to the use of birefringent optical filters to multiplex or demultiplex carriers of different frequencies in the field of wide-band optical communications.

A usage of crystals that is somewhat more related to the interleaving filter context is disclosed in a letter published in Electronics Letters, Vol. 23, No. 3 dated 29 January 1987, at pp. 106 and 107, by W. J. Carlsen et al, discussing the use of a series of birefringent crystals configured to improve the characteristics of systems disclosed by articles on prior tunable multiplexers/demultiplexers (referenced therein). All of these multiplexers are intended to be used with either of two lasers about 15 to 25 nm apart in optical wavelength, but they do not suggest features suitable for an interleaving function or operation at the now common 100 to 200 GHz spacings. A 100 GHz interleaving filter, for example, requires a passband of the order of 0.2 nm (vs about 10 for the Carlsen et al system) and like intermediate stop bands. Carlsen et al do discuss a modification which achieves a, flattened passband using five retardation plates of selected orientations relative to the end polarizers, and achieving polarization independence by splitting the beam so as to direct polarization components separately through the filter.

A need thus exists for a wideband interleaving filter having multiple narrow channel spacings and functioning with wide and flattened passband characteristics, insensitivity to polarization, temperature stabilization and very low insertion loss. The need includes a configuration made of readily available materials that can be readily assembled with the necessary precision, and that is of compact size and also mechanically stable.

SUMMARY OF THE INVENTION

Interleaving circuits for optical networks in accordance with the invention utilize a series of birefringent crystals in varying electrooptic property combinations and orientations to provide densely packed periodic transmission peaks which nonetheless have very low insertion loss, polarization independence, flattened passband peaks and temperature compensation. Pairs of dissimilar birefringent elements in cascaded (series) relationship broaden the transmissive peaks while compensating out the effects of temperature variations. By mounting the elements on a planar reference structure having preset recesses in which adjustments can be made, the unit can be aligned and adjusted with respect to retardation, spacings and orientation for best performance.

In a more specific example of an interleaving filter in accordance with the invention, birefringent crystals are arranged in series between an input and output beam displacing polarizers, together with beam combining elements at the output. The input beam is divided into two beams of orthogonal polarization, which are successively incident on two stages of paired birefringent crystals, the crystals of each pair being of opposite sign of thermooptic coefficient and of specific length ratios, and the crystals of the second pair being twice the length of the first. With crystals of yttrium orthovandate (YVO$_4$) and lithium niobate (LiNbO$_3$), respectfully, the ratio used is 6.60 to 1, and the crystals are precisely spaced apart and provided with anti-reflection coatings on the beam-incident surfaces. The lengths used are inversely related to the desired channel spacing. The optical (c) axes of the crystals are angled relative to the polarize d input signals and to each other to utilize the retardation difference of the birefringent crystals, providing two temperature compensated output beams having flatband maxima, which are then split into another set in an output beam splitting polarizer. One combined beam of both polarization components is collimated for direction to one output fiber, while two separate beams of orthogonal polarization are combined in a group of prisms and a polarizing beam splitter cube, for direction through a collimator to a second output fiber.

This interleaving filter, enclosed in a sealed housing, is less than 20 cm long and 5 cm wide. Placement and angular orientation of the optical elements is facilitated by the shaping of receiving recesses in the optical bench, along the optical beam path. Where a pyroelectric crystal such as LiNbO$_3$ is used, buildup of surface changes due to temperature cycling is avoided by current conduction from the crystal faces that do not receive the optical beams. To achieve precise tuning, crystal faces may be angled so that relative translation of beams with respect to the crystals changes the path length within crystals.

In accordance with other features of the invention, beam displacing polarizers are used in recombination of beams which have passed through the birefringent crystal system. Path length differences can be equalized by employing a half wave plate in both beams or a compensating plate in one of the beams incident on the beam displacing polarizer.

BRIEF DESCRIPTION OF THE DRAWINGS

A better understanding of the invention can be had by reference to the following description, taken in conjunction with the accompanying drawings, in which.

DETAILED DESCRIPTION

Birefringent or polarization filters are described in "Optical Waves in Crystals", Yeh and Yariv, referenced above. The transmission through a birefringent element sandwiched between parallel polarizers is periodic in frequency and is given by:

$$I(\lambda) := \left[\cos\left[\pi \cdot \frac{(n_e - n_o)}{\lambda} \cdot L \cdot 10^6\right]\right]^2 \quad \text{Eqn. 1}$$

where I is the intensity, $\lambda$ is the wavelength in nanometers, $n_e$ is the extraordinary index of refraction, $n_o$ is the ordinary index of refraction and L is the thickness of the crystal in mm. The crystal is oriented with its optic axis at 45 degrees to the input polarization. Note that in this governing relationship the transmission is periodic in optical frequency (i.e. inverse wavelength) and the transmission is lossless at the peak. The present systems use this fundamental controlling Eqn. 1 together with a number of others in providing shaped transmissivity characteristics with low insertion loss, polarization insensitivity and compensation for temperature variation.

Figure 1:
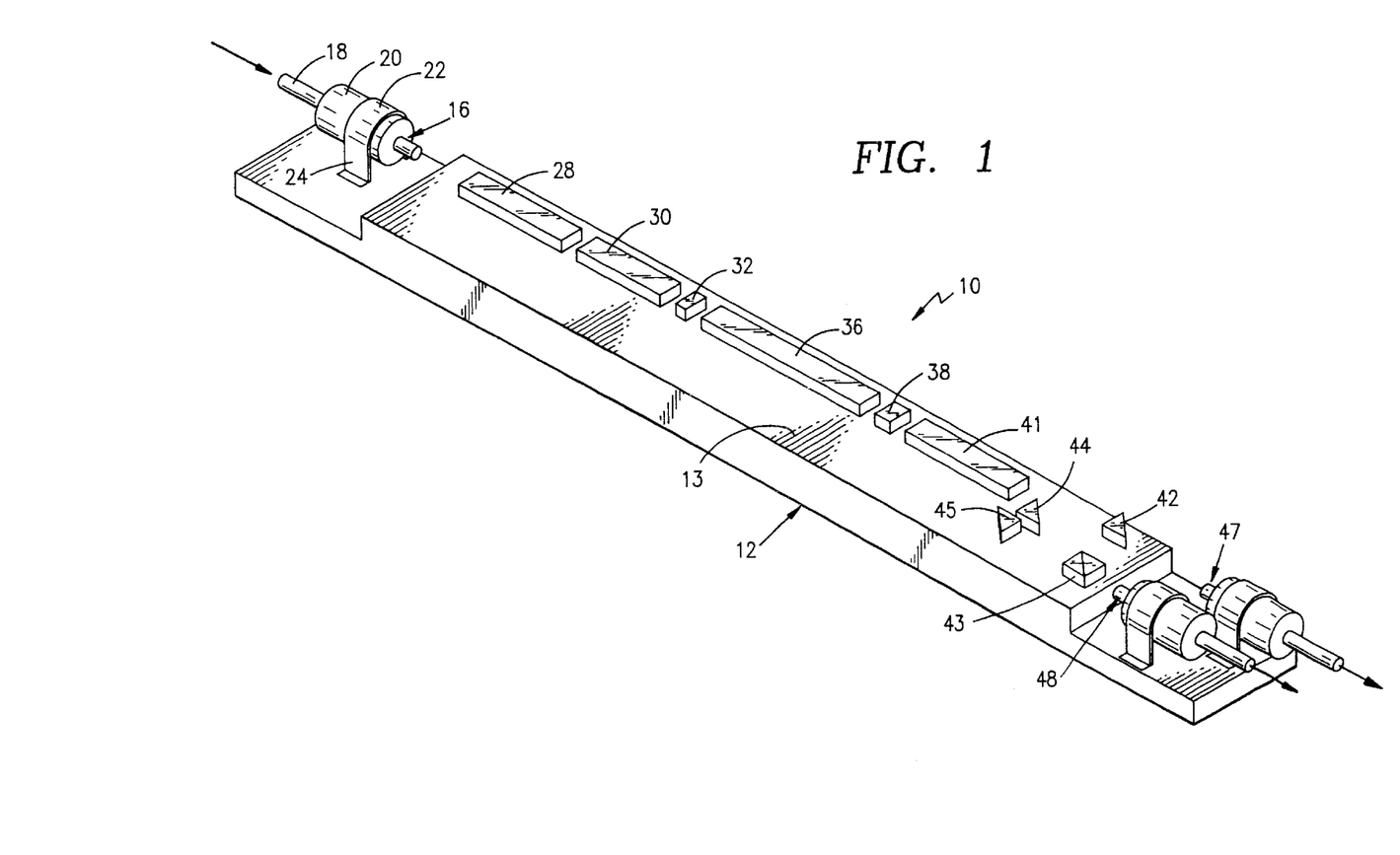
FIG. 1 is a somewhat simplified perspective view of an example of an interleaving optical filter in accordance with the invention.
Figure 2:
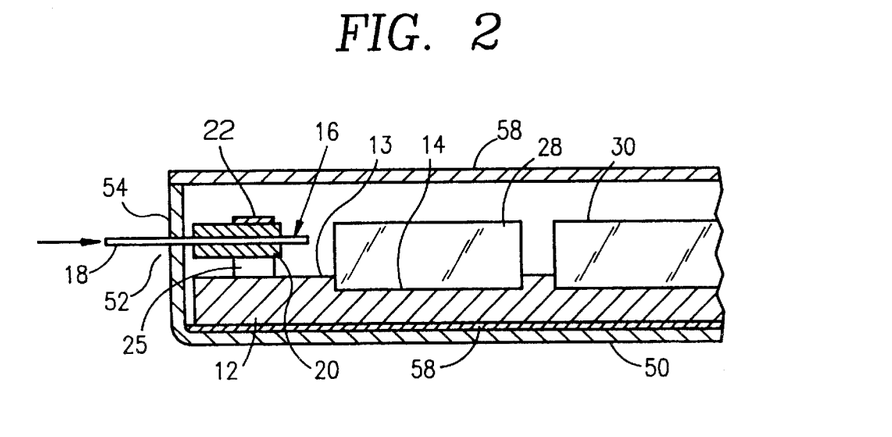
FIG. 2 is a schematic side view representation of the filter of FIG. 1 within a housing.
Figure 3:
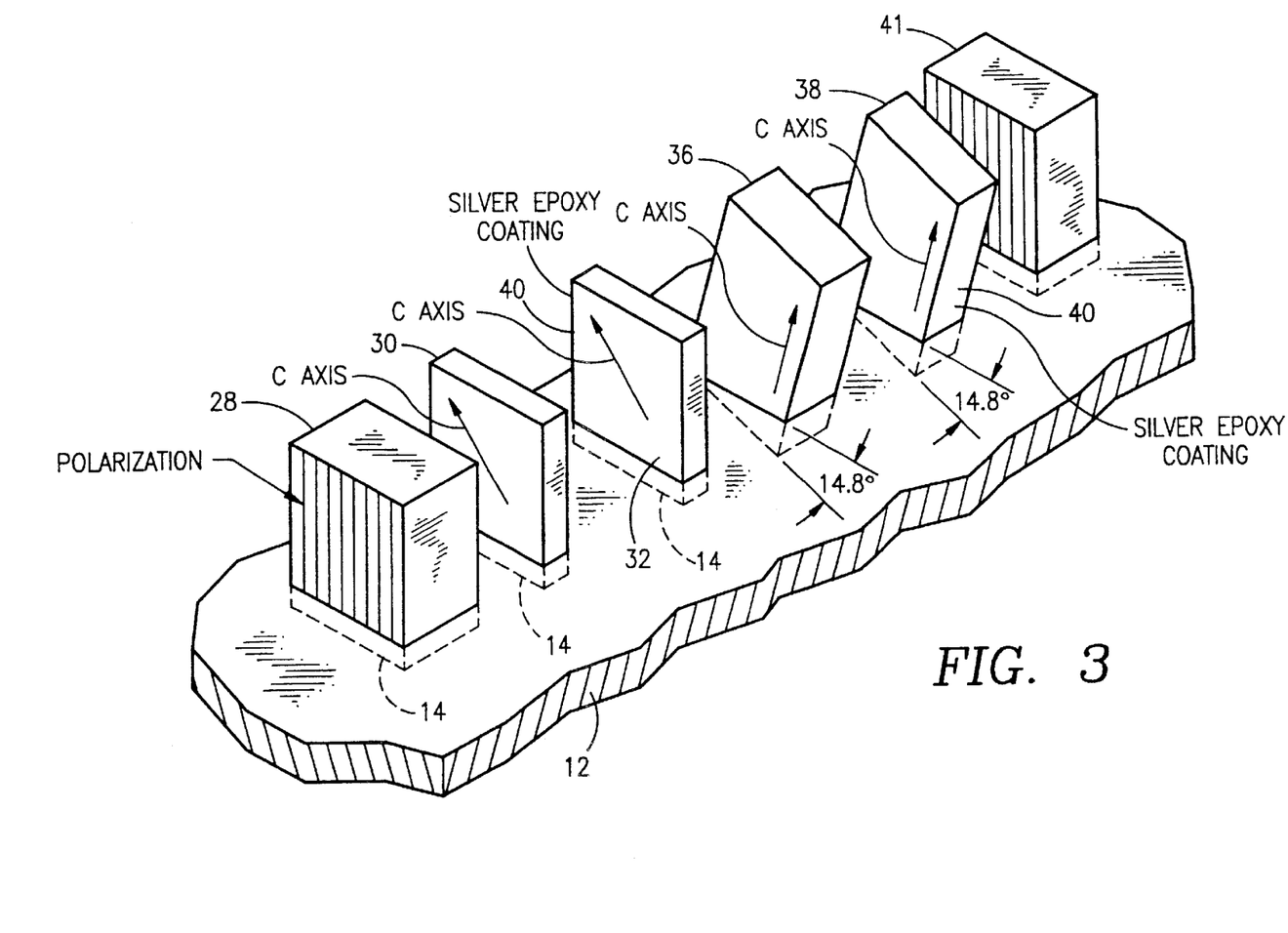
FIG. 3 is a schematic perspective representation of the orientation of crystals and polarizers in the filter of FIGS. 1 and 2, and an optical bench on which they are mounted.

FIGS. 1 to 4 depict the arrangement and relationships of the components of a 1×2 passband flattened and temperature compensated interleaving filter 10, the components of which are seated on a generally planar surface 13 of a stainless steel optical bench 12 (see FIGS. 2 and 3). The optical bench 12 (which alternatively can be of other materials such as silicon) contains shaped recesses 14 formed by electron discharge machining (EDM), in which recesses 14 in the planar surface 13 the polarizing components and crystals are mounted and precisely aligned and angled. A gradient index (GRIN) lens responsive to the wideband input steam from an optical fiber is a collimator 16 for the WDM channel stream. The collimator lens 16 is secured within a cylindrical metal housing 20 which is welded within a stainless steel clip 22 of general U-shape, where base legs 24, 25 are welded to the optical bench 12. The clip 22 design allows for precise and stable tilt and translation adjustment of the collimator lens during assembly.

After collimation, the input beam is transmitted through a beam displacing polarizer 28, here of YVO4 crystal, which splits the input beam into two parallel beams (FIG. 4 particularly) with crossed polarizations that are shifted 1 mm with respect to the other. Splitting the input beam into separate polarizations and then recombining after filtering results in a polarization independent device.

The two beams are then incident on a first birefringent crystal stage comprised of a yttrium orthovanadate (YVO4) crystal 30 and a Lithium niobate (LiNbO$_3$ crystal, 32 configured to form a first a temperature compensated pair. There are a number of different birefringent materials which can be used for temperature compensation, including YVO4 and LiNbO3. YVO4 has high birefringence, $\Delta n=0.2039$ at 1550 nm, and is readably available commercially. LiNbO3 has a large thermooptic coefficient opposite in sign to YVO4 and is also readably available commercially. The required length ratio for temperature compensation of YVO4 to LiNbO3 is 6.60:1. The lengths scale inversely with channel spacing, and 50 Ghz and 25 GHz spacing are achievable. The optical (C) axis of the YVO4 crystal and the LiNbO3 crystal 32 are oriented at 45° relative to the input polarizer 28. For a 100 Ghz to 200 Ghz channel spacing the YVO4 crystal 30 is 7.370 mm long and the lithium niobate crystal 32 is 1.116 mm long.

The second stage, which is also temperature compensated but employed to flatten the peak of maximum transmissivity of the passband is comprised of another set of YVO4 36 and lithium niobate crystals 38. The lengths of each of these are twice that of the like crystals used in the first stage. The optical axes of each separate crystal 36,38 of the second pair are oriented along a crystal edge and the crystals are tilted −14.8 degrees with respect to the top surface 13 of the optical bench 13. The edges of the lithium niobate crystals 32 and 38 are electrically shorted with a conductive coating 40 such as silver epoxy which conducts away charges built up due to the pyroelectric property of $LiNbO_3$. Such electric charges would otherwise tend to build up on the surface of crystals 32, 38 as the temperature is cycled, and the result could be uncontrolled hysteresis of the index of refraction. Such charges must be eliminated for $LiNbO_3$ to be used as a temperature compensating element. Conductive silver epoxy 40 (or metallization or anti static liquid) of the +/− c faces of a crystal electrically shorts the crystal and dissipates charges. Dopants such as MgO which reduce the electrical conductivity would also reduce the pyroelectric effects.

Figures 4, 6:
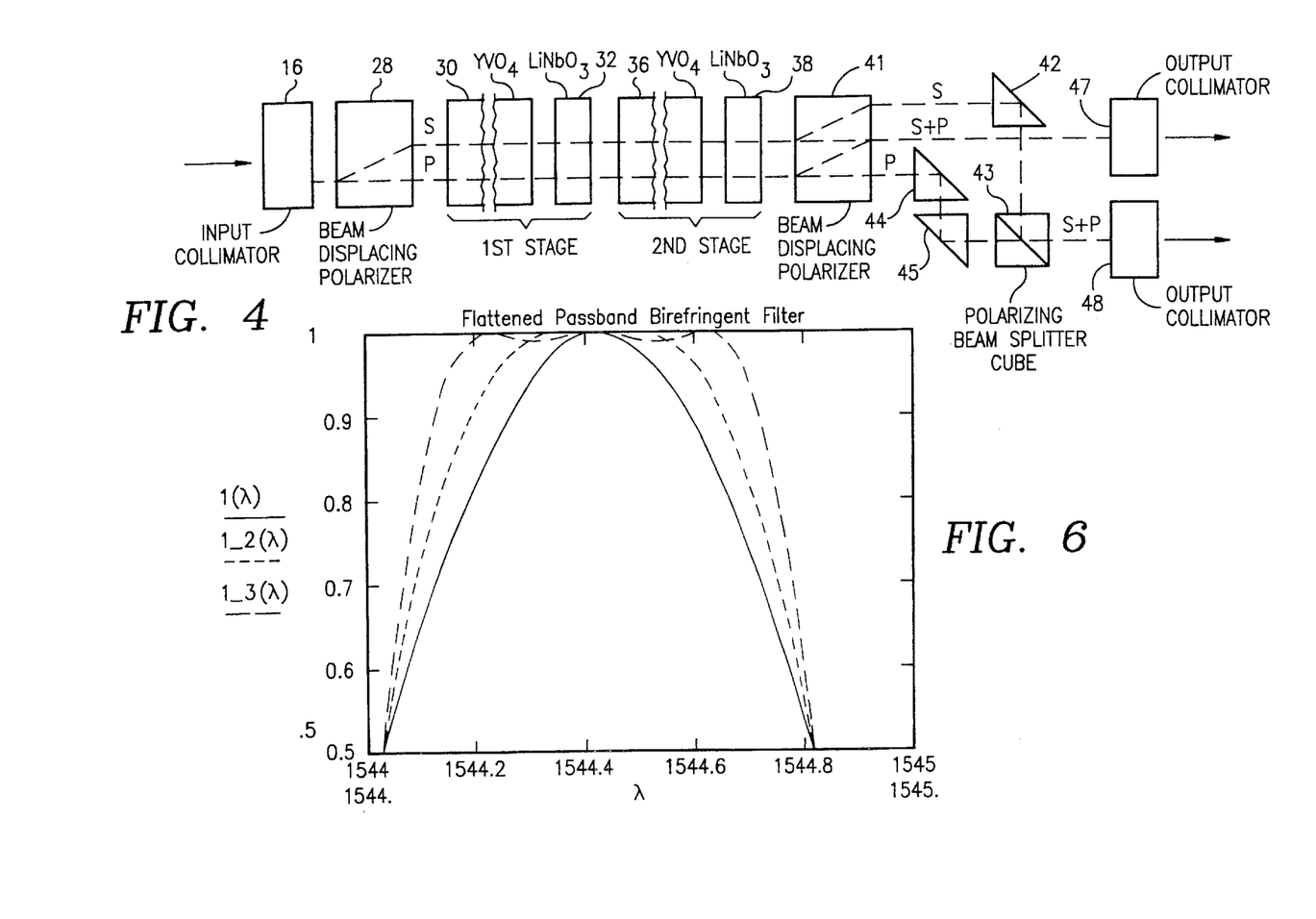
FIG. 4 is a simplified plan view of the filter of FIGS. 1–3, illustrating beam paths along the structure.
FIG. 6 is a waveform diagram of characteristics of a series of birefringent crystals, showing passband flattening.

The two beams after being transmitted through the birefringent crystals 30, 32, 36, 38 are incident on another YVO4 beam displacing polarizer 41. Each input beam is split up into two beams with different polarizations, as best seen in FIG. 4. Two of the beams with crossed polarization overlap and are coupled directly into one of two output GRIN lens collimators 47, 48. The two other beams are combined in part by using a single prism 42 to direct the s polarized beam to one side of a polarizing beam splitter cube, 43 with the p polarized beam being redirected off a pair of prisms 44, 45 to an orthogonal side of the beam splitter cube 43. The path lengths of the two combined beams are matched to better than 1 mm in order to minimize polarization mode dispersion (PMD). The resulting overlapping beams are then coupled into the second output collimator 48. The output collimators 47, 48 are laser welded to clips which are in turn laser welded to the optical bench 12.

Referring specifically to FIG. 2, the optical bench 12 is mounted inside a tray 50 with a fiber feedthrough 52 in the end wall 54 receiving an input optical fiber 18 in line with the input collimator 16. Although the output side is not shown in this view it differs in having only pairs of elements for delivering the two output beams. The bench 12 is attached to the base of the tray 50 with RTV adhesive or, as shown, a silicone sheet 58 can be used to provide cushioning from shock and vibration. The input fiber 18 and two output fibers are fed through the fiber feedthroughs and sealed with epoxy. A lid 58 is attached to the body of the tray 50 and the waist is sealed with epoxy in a dry nitrogen atmosphere.

All of the optical surfaces, including the crystals, are antireflection coated to minimize optical loss.

Figure 5:
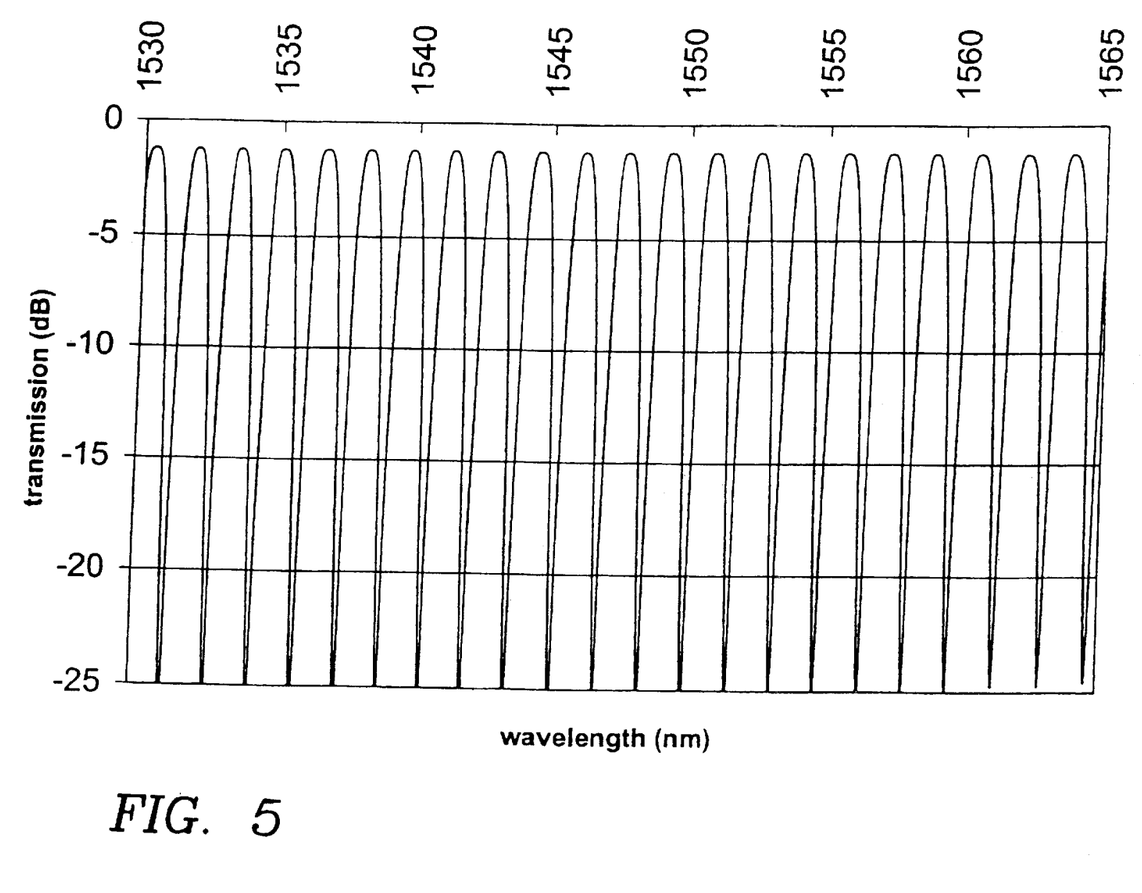
FIG. 5 is a waveform diagram showing the periodic characteristic of a 100 GHz interleaving filter with passband flattening.

The experimentally measured transmission (using an LED and an optical spectrum analyzer) of a fiber coupled, passband flattened 100 Ghz interleaver is shown in FIG. 5. The unit uses two stages of lithium niobate and YVO4 crystals. This measured response is charted in FIG. 5. The spacing between transmissivity peaks is that of a 100 Ghz channel spacing to 200 Ghz channel spacing interleaving filter.

Wider passband flatness in a filter (i.e. a broadening of the width of the transmissivity peaks, prevents narrowing of the transmission spectra when filters are cascaded and reduces the required wavelength accuracy of the WDM source lasers. It also improves system performance by reducing the attenuation of the information content of a modulated signal. By adding additional birefringent elements, the passband of the interleaving filter is flattened to a selectable degree. As shown in FIG. 6, which depicts response variations between one, two and three crystals in series the passband of a single element birefringent filter is 0.35 nm wide at the −0.5 dB bandwidth By adding a second and third birefringent element, shown by dotted and dashed lines respectively, the maximum is progressively broadened. The first element is of length L and oriented with its C axis at 45 degrees. For a series of two, the second element is of length 2 L and has an orientation of −14.8 degrees, substantially widening the amplitude at maximum without broadening the cutoff point. Addition of a third element of length 2 L and orientation=+ 10 degrees broadens the maximum even further, but introduces intermediate dips of minor magnitude. For a 100 Ghz/200 ghz interleaver the bandwidth for a passband flatness of −0.5 dB is 0.35 nm for the single stage, 0.47 nm for the two stage, and 0.60 nm for the three stage design. Even better flatness can be achieved by adding more elements, however this comes at the expense of additional cost and insertion loss. Although the curves depict the results of measurements with crystals of only one type, they are equally valid for temperature compensated combinations using different crystal types.

The polarization dependent loss (PDL) of the interleaving filter must be minimized to a value below 0.1 dB. This is achieved during coupling of the two crossed polarization beams incident on each output GRIN lens collimator 46 or 48. In order to minimize PDL the beams must be coupled into the output fiber with the same efficiency. This is not necessarily at the peak coupling efficiency of each beam. This can be determined by varying or switching the input polarization to the interleaving filter 10 until no variation of power on the output fibers is measured.

In order to make a polarization independent fiber based interleaving filter, the signal is split up into two beams using the lossless beam displacing polarizer 28. The two beams are transmitted through the birefringent elements 30, 32, 36, 38 and recombined into two outputs using the additional lossless beam displacing polarizer 42. The s polarized output of one of the beams is recombined with the p polarization of the other beam. Every other channel of a WDM stream is thus separated into one of the two output collimators 47, 48 and the output fibers to which they couple.

Devices typically operate over a 0–70° C. temperature range and should be passively temperature compensated. For a 100 Ghz filter response the center wavelength drift should typically be less than +/−0.0015 nm/° C. The use of different crystals with opposite signs of the birefringence or thermooptic coefficient in the manner described achieves this result. The retardance of two crystals in series is given by:

$$\Gamma_1 + \Gamma_2 := \frac{2 \cdot \pi}{\lambda} \cdot (L_1 \cdot \Delta n_1 + L_2 \cdot \Delta n_2)$$

Where $\Gamma$ is the phase retardance, L is the length of each crystal, and the birefringence is given by $\Delta n_1 = n_{e,1} - n_{o,1}$ for the first crystal. For the second crystal $\Delta n_2 = n_e - n_o$ if the crystal axis is parallel to that of the first crystal and is $\Delta n_2 = n_o - n_e$ if it is rotated 90 degrees. The change of retardance with temperature is given by:

$$\frac{d(\Gamma_1 + \Gamma_2)}{dT} := \left(\frac{2 \cdot \pi}{\lambda}\right) \cdot \left(L_1 \cdot \frac{d(\Delta n_1)}{dT} + L_2 \cdot \frac{d(\Delta n_2)}{dT} + L_1 \cdot \alpha_1 \cdot \Delta n_1 + L_2 \cdot \alpha_2 \cdot \Delta n_2\right).$$

Where α is the thermal expansion coefficient. The condition for compensation is given by:

$$\frac{L_1}{L_2} := \frac{-\left(\frac{d(\Delta n_1)}{dT} + \alpha_1 \cdot \Delta n_1\right)}{\left(\frac{d(\Delta n_2)}{dT} + \alpha_2 \cdot \Delta n_2\right)}$$

Usually the thermal expansion coefficient term can be neglected. With the optic axis of the crystals in alignment, compensation is achieved using two crystals with different signs of the thermooptic coefficient. If the crystals are rotated 90 degrees with respect to each other, materials can be used with the same sign of the thermooptic coefficient.

During assembly, both the frequency period and absolute wavelength of the peaks must be adjusted. This can be controlled by tight tolerances of the thickness of the polished crystals. The crystals or the input beam angle can also be tilted to adjust the so wavelength. Another approach is to polish the crystal to form a slight wedge shape, with the beam-incident faces thus being non-orthogonal to beam direction. Then the wavelength and period can be adjusted by translating the beam on the crystal. In order for both the parallel beams to see the same thickness of crystal, the wedge angle should be transverse to the plane of the two incident beams. Two crystals with opposing wedges can be translated relative to each other to adjust the thickness and minimize any beam steering. Another approach to tune the wavelength is to choose from a set of LiNbO3 crystals at slightly different thickness, and tuning by substituting for the best response. A spacing of 10 microns can allow for tuning while only slightly changing the temperature compensation condition. Adjustment of the absolute wavelength peaks of the filter can also be achieved by using a zero order half wave plate after each of the stages. By rotating the waveplates additional birefringence is introduced which tunes the filter. Zero order waveplates are used to minimize temperature dependence of the waveplate.

The alignment and tolerance of the optical components are critical. Both insertion loss and manufacturing assembly cost need to be minimized. An alternative to the stainless steel optical bench is to use a silicon bench as a platform to mount all of the components. Precise V- grooves are etched onto the silicon substrate and components are dropped into them and attached with epoxy.

1×2 interleavers can be cascaded to split every Nth channel into one of N output fibers.

For the second stage a crystal of half the thickness of the first stage is required. In general the transmission through an N stage interleaver will have a transmittance at one of the output fibers given by:

$$I(\lambda) := \prod_{i=1}^{N}\left[\cos\left[\pi \cdot \frac{(n_e - n_o)}{\lambda} \cdot \frac{L}{i} \cdot 10^6\right]\right]^{2 \cdot i}$$

The other fibers will have the same wavelength dependent transmittance with the peaks shifted by a multiple of the input channel spacing.

Each stage of a birefringent filter is not limited to separating every other channel. More generally a single stage can group every Nth channel onto a single fiber and the remaining (N−1) adjacent channels in each period onto a separate fiber. One approach is to use a Solc type filter described in the Yeh and Yariv treatise referred to above. There are two designs, folded and fanned, which rely on a stack of rotated birefringent plates of equal thickness.

Figure 7:
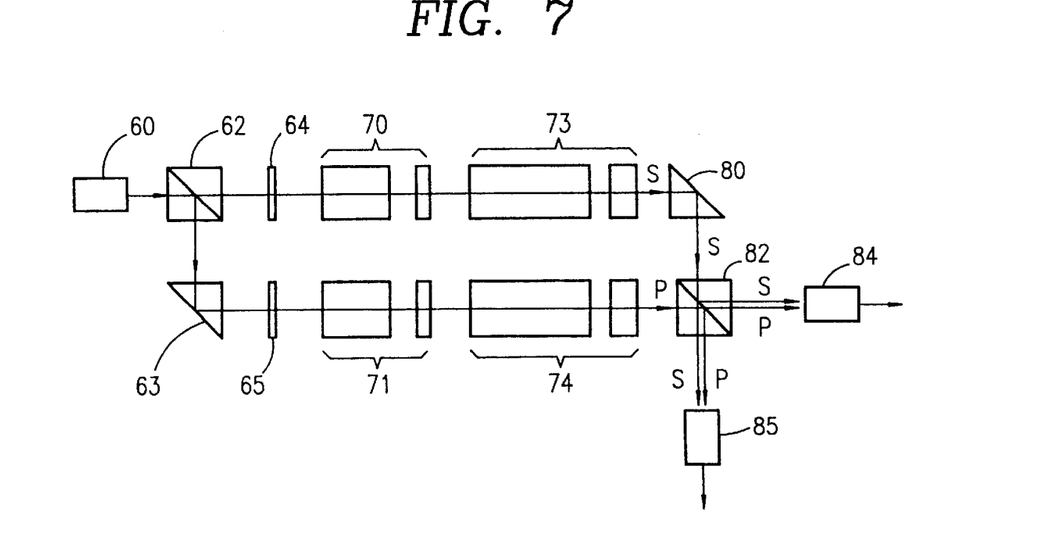
FIG. 7 is a simplified block diagram view showing further features as to interleaving filter design and construction.

Another example of an arrangement in accordance with the invention, referring now to FIG. 7, divides the input beam from an input collimator 60 into an s polarized beam and an orthogonal p polarized beam at a first beam splitting polarizer cube 62. The p polarized beam is directed back into parallelism for compactness at a prism 63, and both beams then pass separately through sheet polarizers 64, 65 to temperature compensating birefringent crystal pairs 70, 71 and 73, 74 as described above, after which separate beam pairs are recombined. S polarized components are angled off a prism 80 to one face of a second polarizer cube 82, which receives the p polarized beam at another face. From the second cube 82 two orthogonal beams merge, each combining s and p components, and the two combined beams are directed to first and second collimators 84, 85 respectively. This arrangement simplifies beam recombination but, because of the characteristics of polarizing beam splitters the cross-talk between adjacent channels is higher, even though reduced somewhat by the sheet polarizers. In addition, the costs of using separate crystals of equal lengths must be considered.

Figure 8:
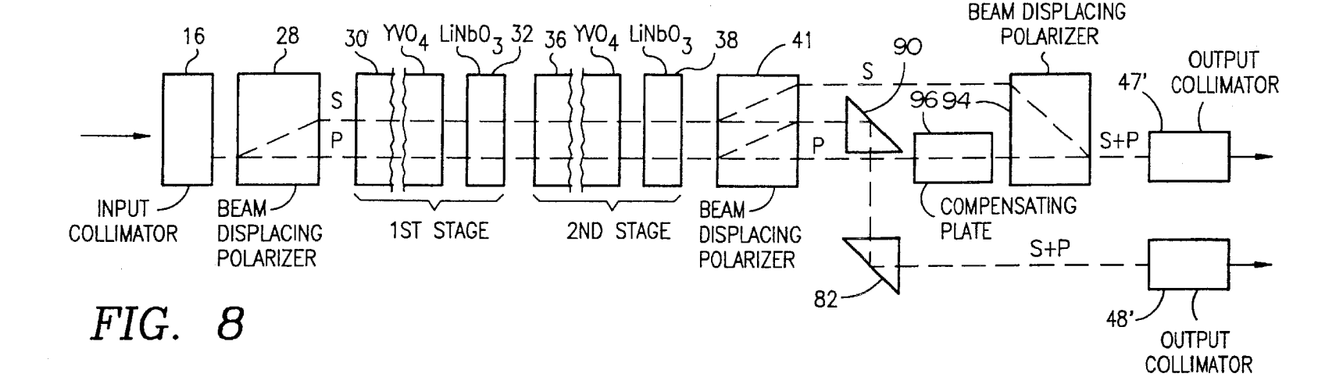
FIG. 8 is a simplified block diagram view showing further features as to interleaving filter design and construction.
Figure 9:
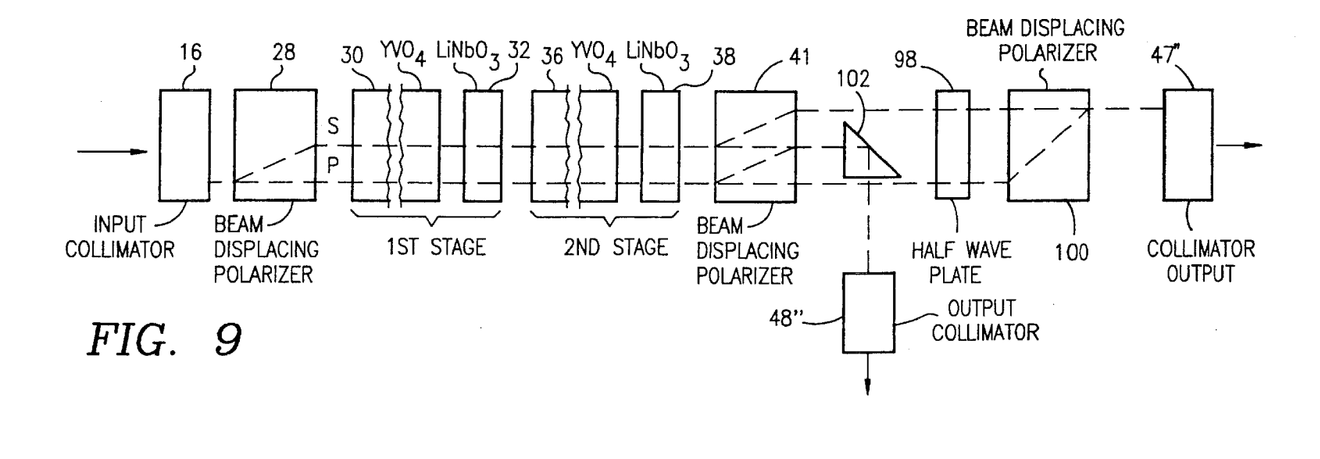
FIG. 9 is a simplified block diagram view showing further features as to interleaving filter design and construction.

Other examples of arrangements in accordance with the invention, referring to FIG. 8 and FIG. 9 make use of different optical arrangements to recombine the s and p polarized beams into the second output fiber. In FIG. 8 the optical layout from the input collimator through the birefringent crystals and the second beam displacing polarizer is the same as described previously. Here, however, a prism 90 is used to pick off the center beam emerging from the second beam displacer 41 which contains both required polarizations. This beam is reflected with another prism 92 and coupled directly into an output collimator 47. The other two beams emerging from the second beam displacer 41 are recombined within a third beam displacing polarizer 94. The length of the last beam displacer 90 is twice that of the first two 28, 41 due to the need for twice the displacement. Since the path lengths of the two beams would not otherwise be matched, a compensating plate 96 is inserted in one of the beam paths to match the optical path length. A high index material such as lithium niobate with the crystal axis aligned with the input polarization, is used in the s polarized beam.

Another approach to match the optical path lengths is shown in FIG. 9. The two beams emerging from the second beam displacer 41 are transmitted through a half wave plate 98 and then recombined using a third beam displacement polarizer 100. The half wave plate 98 rotates the polarizations 90 degrees, which ensures that the overall path lengths of the two beams are matched after going through the final beam displacer 100. The half wave plate 98 is a zero order design to reduce the temperature dependence. The combined beams in the midregion of the second beam displacing polarizer 41 are angled off a common prism 102 to the second output collimator 48.

Although a number of variants and alternatives have been described, the invention is not limited thereto but encompasses all forms and modifications within the scope of the appended claims.

What is claimed is:

1. An interleaving optical filter for wave energy, for providing a periodic low loss transmissivity characteristic in the rate of 25 GHz to 200 GHz spacing and operating with substantial polarization independence and with compensation for temperature variations, said filter comprising:

a support providing a generally planar surface extending substantially parallel to a principal optical axis of the filter;

an input collimator mounted on the support at an input region thereon to provide a collimated beam along the principal optical axis;

a first beam displacing polarizer mounted on the support to receive the collimated beam, the polarizer transmitting two beams of orthogonal polarization that are parallel to the principal optical axis;

a first pair of birefringent crystals receiving the two beams and being of different thermooptic coefficients and with lengths along the principal optical axis that are selected to compensate for temperature-induced phase retardation variations, the first pair being rotated 45° with respect to the planar surface about the principal optical axis;

a second pair of birefringent crystals of materials like the first pair but of different length, and being rotated with respect to the planar surface to provide transmissivity peaks that have passband flatness of −0.5 dB of about 0.47 nm and a center wavelength drift of less than ±0.0015 nm/°C.;

a second beam displacing polarizer receiving the two beams transmitted through the pairs of birefringent crystals for splitting each of the two beams into two beams with different polarizations, and a beam recombining unit receiving the beams from the beam displacing polarizer for combining the beams therefrom into two polarization independent beams with less than one 1 mm path length difference.

2. An interleaving optical filter as set forth in claim 1 above, including output collimators coupled to transmit the different polarization independent beams.

3. An interleaving optical filter as set forth in claim 2 above, wherein the input collimator and output collimators comprise gradient index lenses, wherein the filter further includes housings attached to the collimators and the housings are attached to the support, wherein the collimators are disposed along the principal axis, and the filter further comprises input and output optical fibers in communication with the input and output collimators respectively.

4. An interleaving optical filter as set forth in claim 1 above, wherein the second beam displacing polarizer transmits a pair of orthogonally polarized individual beams and a combined beam having orthogonally polarized components, and the beam recombining unit directs the combined beam as one of the outputs.

5. An interleaving optical filter as set forth in claim 4 above, wherein the beam recombining unit includes a third beam displacing polarizer receiving the orthogonally polarized individual beams, and further includes a path length compensator in one of the beam paths to the third beam displacing polarizer.

6. An interleaving optical filter as set forth in claim 4 above, wherein the beam recombining unit includes a third beam displacing polarizer receiving the orthogonally polarized individual beams, and further includes a half wave plate in both beam paths to the third beam displacing polarizer.

7. An interleaving optical filter as set forth in claim 4 above, wherein the beam recombining unit comprises a polarizing beam splitter cube and prism means for directing the orthogonally polarized individual beams to different faces of the beam splitter cube.

8. An interleaving optical filter as set forth in claim 1 above, wherein the birefringent crystals are of opposite sign, and wherein the second pair of crystals have a negative angular rotation relative to the angle of rotation of the first pair of crystals with respect to the planar surface.

9. An interleaving optical filter as set forth in claim 1 above, wherein the pairs of birefringent crystals each comprise a YVO4 crystal and an $LiNbO_3$ crystal having length ratios of 6.60:1 and wherein the crystals of the second pair are twice the length of those in the first pair.

10. An interleaver filter as set forth in claim 1 above, wherein the first and second beam displacing polarizers are of YVO4 crystal and the beam recombining unit comprises a prism and polarizing beam splitter cube.

* * * * *